(12) United States Patent  
Minaminakamichi et al.

(10) Patent No.: US 9,360,110 B2  
(45) Date of Patent: Jun. 7, 2016

(54) TRANSMISSION APPARATUS

(71) Applicant: HONDA MOTOR CO., LTD., Tokyo (JP)

(72) Inventors: Takashi Minaminakamichi, Wako (JP); Keiji Tojo, Wako (JP); Shinji Fujimoto, Wako (JP); Katsunori Akiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/657,449

(22) Filed: Mar. 13, 2015

(65) Prior Publication Data

US 2015/0260268 A1    Sep. 17, 2015

(30) Foreign Application Priority Data

Mar. 17, 2014 (JP) ................. 2014-053376

(51) Int. Cl.

| F16H 63/32 | (2006.01) |
|---|---|
| F16D 23/02 | (2006.01) |
| F16H 3/00 | (2006.01) |
| F16H 63/02 | (2006.01) |
| F16H 61/688 | (2006.01) |

(52) U.S. Cl.  
CPC ............. *F16H 63/32* (2013.01); *F16D 23/02* (2013.01); *F16H 3/006* (2013.01); *F16H 61/688* (2013.01); *F16H 2063/025* (2013.01); *F16H 2200/0056* (2013.01); *Y10S 903/917* (2013.01)

(58) Field of Classification Search  
CPC ............. F16H 3/08; F16H 2003/0803; F16H 2003/0826; F16H 3/091; F16H 3/093  
See application file for complete search history.

(56) References Cited

U.S. PATENT DOCUMENTS

| 2012/0004063 A1 | 1/2012 | Koyama et al. | |
| 2012/0021861 A1* | 1/2012 | Sakai | B60K 6/365 475/5 |

FOREIGN PATENT DOCUMENTS

| WO | 2010/046307 A1 | 4/2010 |
| WO | 2010/110343 A1 | 9/2010 |

* cited by examiner

*Primary Examiner* — Derek D Knight  
(74) *Attorney, Agent, or Firm* — Westerman, Hattori, Daniels & Adrian, LLP

(57) ABSTRACT

In a dual clutch transmission, on one end side of a first input shaft connectable to an internal combustion engine via a first clutch, a planetary gear mechanism for a predetermined speed stage is provided, and a sun gear thereof is provided to rotate integrally with the first input shaft and an electric motor. A ring gear is fixed to a case, and a synchromesh mechanism is provided connectably and disconnectably with respect to the planetary gear carrier for selecting the predetermined speed stage. When the synchromesh mechanism is connected to the planetary gear carrier, rotation of the carrier is transmitted to the countershaft. The ring gear is attached to an annular attachment member to be fixed to the case. In a circumferential side surface of the attachment member, openings for inserting a shift fork and an opening for inserting a finger for the convenience of assembly work are provided.

3 Claims, 7 Drawing Sheets

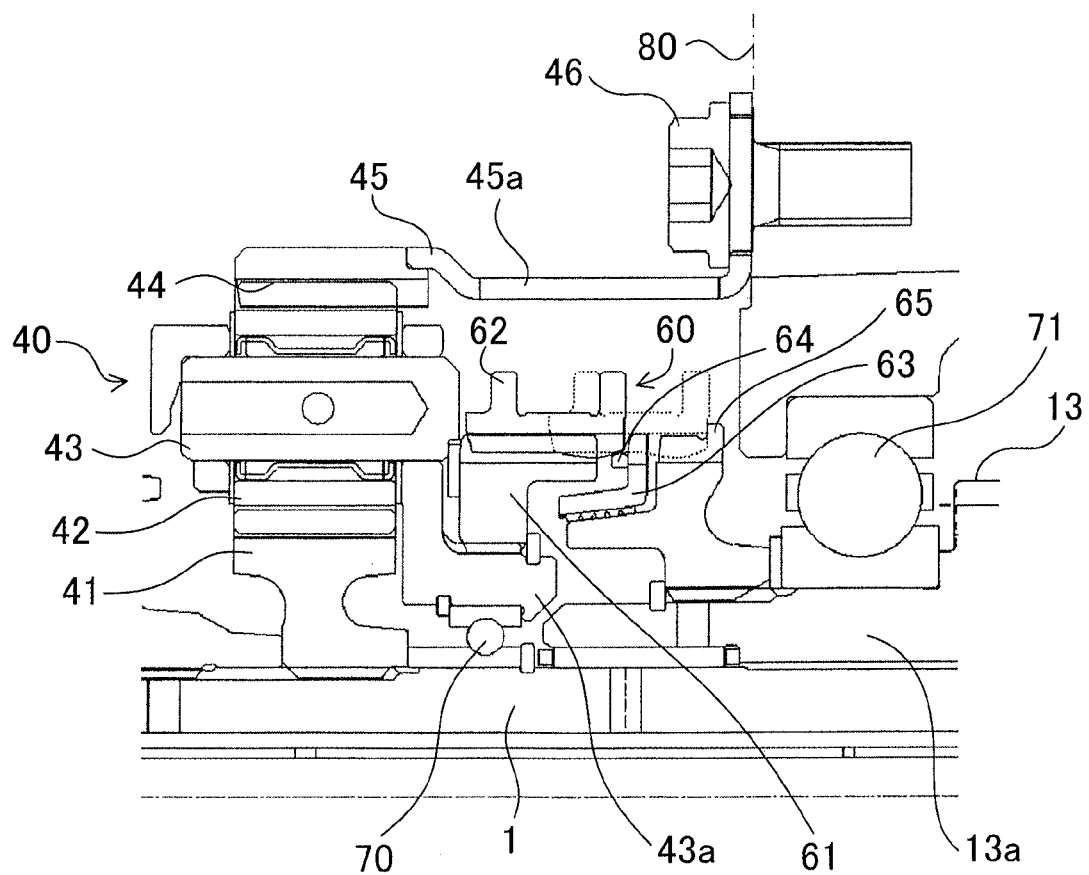
F I G. 3

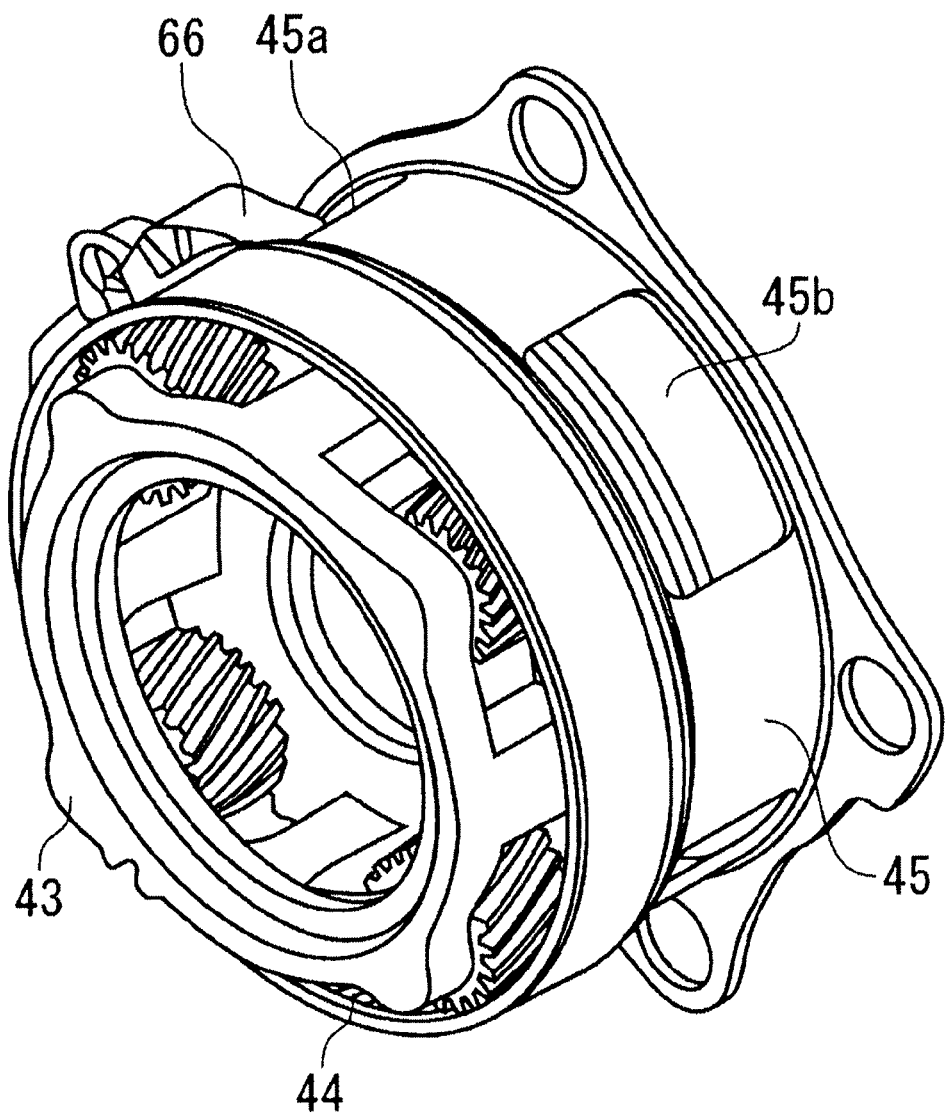
F I G. 5

TRANSMISSION APPARATUS

TECHNICAL FIELD

The invention relates to a transmission apparatus (power transmission apparatus) for a hybrid vehicle that includes an internal combustion engine and an electric motor as a drive source, and more particularly to an improvement of a power transmission structure that employs a planetary gear mechanism provided in a dual clutch transmission (DCT) that includes, two gear shafts for odd-numbered speed stages and even-numbered speed stages, and a speed-change gear mechanism relating thereto.

BACKGROUND ART

International Patent Publication No. WO2010/046307 and International Patent Publication No. WO2010/110343 disclose conventional technique for a dual clutch transmission (DCT) that includes two gear shafts, for odd-numbered speed stages and even-numbered speed stages, and a speed-change gear mechanism relating thereto, in a hybrid vehicle that includes an internal combustion engine and an electric motor as a drive source. According to these publications, a first speed-change gear mechanism provided on a first input shaft (namely, a first gear shaft) that is connected/disconnected to the internal combustion engine via a first clutch is provided with drive gears for odd-numbered speed stages (for example, third- and fifth-speed stages) that is selectively connectable to the first input shaft (gear shaft) via a synchronizer (synchromesh mechanism), and driven gears that mesh with the respective drive gears are provided on a countershaft (speed-change output shaft). Further, a second speed-change gear mechanism provided on a second input shaft (namely, a second gear shaft) that is connected/disconnected to the internal combustion engine via a second clutch is provided with drive gears for even-numbered speed stages (for example, second- and fourth-speed stages) that is selectively connectable to the second input shaft (gear shaft) via a synchronizer (synchromesh mechanism), and driven gears that mesh with the respective drive gears are provided on the countershaft (speed-change output shaft). Meanwhile, one end of the first input shaft (gear shaft) is connected to the electric motor and the planetary gear mechanism is also disposed on the one end of the first input shaft (gear shaft) to function as a first-speed gear stage.

FIG. 7 is a skeleton diagram that illustrates some parts relating to the planetary gear mechanism that have been extracted from the description of the conventional dual clutch transmission above. In the figure, reference numeral 1 denotes the first input shaft (gear shaft), 2 denotes the second input shaft (gear shaft), and 3 denotes the countershaft (speed-change output shaft). A third-speed drive gear 13 and a fifth-speed drive gear 15 are concentrically provided on the first input shaft 1 so as to be relatively rotatable thereto. A second-speed drive gear 22 and a fourth-speed drive gear 24 are concentrically provided on the second input shaft 2 so as to be relatively rotatable thereto. On the countershaft 3, a driven gear 31 that meshes with the third-speed drive gear 13 and a driven gear 32 that meshes with the fifth-speed drive gear 15 are fixed to rotate integrally therewith. In addition, the driven gear 31 meshes with the second-speed drive gear 22 and the driven gear 32 meshes with the fourth-speed drive gear 24. A synchronizer (namely, a synchromesh mechanism) 51 is provided to selectively transmit rotation of the first input shaft 1 to either of the third-speed drive gear 13 and the fifth-speed drive gear 15. A synchronizer (synchromesh mechanism) 52 is provided to selectively transmit rotation of the second input shaft 2 to either of the second-speed drive gear 22 and the fourth-speed drive gear 24.

A planetary gear mechanism 40 is provided on one end of the first input shaft (gear shaft) 1. A sun gear 41 of the planetary gear mechanism 40 is coupled to the first input shaft (gear shaft) 1 and the sun gear 41 is also coupled to a rotor of an electric motor MOT. In the planetary gear mechanism 40, the planetary gears 42 are engaged with the sun gear 41. A carrier 43 of the planetary gears 42 is fixed to the third-speed drive gear 13 such that the carrier 43 constantly rotates integrally with the third-speed drive gear 13, and the third-speed drive gear 13 is engaged with the third-speed driven gear 31 of the countershaft 3. As a result, the carrier 43 of the planetary gears 42 is dragged by rotation of the countershaft 3 even when a drive power is not acting thereon, such that the carrier 43 is constantly rotating along with the countershaft 3. In the planetary gear mechanism 40, a ring gear 44 is engaged with the planetary gears 42. The ring gear 44 is arranged such that it can be selectively fixed via the synchronizer (synchromesh mechanism).

When selecting a first-speed stage, the ring gear 44 is fixed to a case (not shown) of the transmission via the synchronizer (synchromesh mechanism) 50 and the synchronizer (synchromesh mechanism) 51 is maintained in a neutral state. Accordingly, the rotation of the first input shaft 1 is transmitted to the countershaft 3 via the sun gear 41, the planetary gears 42, the carrier 43, the third-speed drive gear 13 and the third-speed driven gear 31. When any of speed stages other than the first-speed stage is selected, the synchronizer (synchromesh mechanism) 50 is disengaged and the ring gear 44 constantly rotates freely in accordance with the rotation of the countershaft 3.

In the aforementioned prior art, a speed of the ring gear 44 is increased in accordance with differential rotation between the sun gear 41 to which the rotation of the first input shaft 1 is constantly transmitted and the carrier 43 to which the rotation of the countershaft 3 is constantly transmitted. In particular, in a high vehicle speed region, despite the fact that the planetary gear mechanism 40 is not involved in changing speeds, a large differential speed is generated due to rotation caused by dragging, which results in unnecessary rotation loss as well as generation of heat due to rotational friction.

SUMMARY OF THE INVENTION

In view of the aforementioned prior art problems, it is an object of the present invention to provide a transmission apparatus in which a large differential speed is not generated in the planetary gear mechanism by dragging and that unnecessary rotation is eliminated as much as possible.

According to the present invention, it is provided a transmission apparatus for use of an internal combustion engine and an electric motor as a drive source, which comprises: a first gear shaft (1) configured to disconnectably couple to the internal combustion engine via a first clutch (C1); a second gear shaft (2) configured to disconnectably couple to the internal combustion engine via a second clutch (C2); a first speed-change gear mechanism (13, 15, 17, 51, 53) provided on the first gear shaft and configured to selectively set a speed stage to any one of a first group of speed stages; a second speed-change gear mechanism (22, 24, 26, 52, 54) provided on the second gear shaft and configured to selectively set a speed stage to any one of a second group of speed stages; a countershaft (3) coupled to the first and second gear shafts via the first and second speed-change gear mechanisms so that a rotational output corresponding to a selected speed stage is produced from the countershaft; a planetary gear mechanism (40) including a sun gear (41), planetary gears (42) and a ring gear (44), wherein the sun gear (41) is arranged so as to rotate integrally with the first gear shaft and the electric motor, the ring gear (44) is fixed to a case of the transmission, and a speed-changed output is produced from the planetary gears; and a coupling element (60) provided connectably and disconnectably with respect to a carrier (43) of the planetary gears (42) and configured to transmit rotation of the carrier of the planetary gears to the countershaft when the coupling element is connected to the carrier of the planetary gears in order to select a predetermined speed. The reference numerals in parenthesis show the reference numerals in the drawings of the components corresponding to the embodiments described later.

According to the invention, when the ring gear is constantly fixed in the planetary gear mechanism and a predetermined speed stage is selected, the rotation of the planetary gear carrier is transmitted to the countershaft via the connectable/disconnectable coupling element. The planetary gear carrier is not dragged by the rotation of the countershaft, and the ring gear 44 does not rotate. Accordingly, the differential speed of the planetary gear mechanism can be controlled particularly in the high-speed region of the vehicle with a high workload (because the planetary gear carrier is not dragged by the countershaft), the no-load rotational loss can be drastically reduced, and generation of heat due to rotational friction can also be controlled. Consequently, the power transmission efficiency of the transmission apparatus is improved, as well as the fuel efficiency and the cooling performance.

According to one embodiment, the planetary gear mechanism is provided on one end of the first gear shaft, a counter member that rotates integrally with the countershaft is provided concentrically with the first gear shaft, the ring gear is attached to one end side of an annular attachment member which is attached to the case, the coupling element includes a first coupling member configured to rotate integrally with the carrier of the planetary gears, a second coupling member configured to rotate integrally with the counter member, a connecting/disconnecting member configured to mechanically displace to connect or disconnect the first and the second coupling members, and a movable member for displacing the connecting/disconnecting member, and an opening is formed in a circumferential side surface of the attachment member to allow the movable member to be inserted through the opening.

According to the embodiment, the ring gear is attached to one end side of the annular attachment member, and the ring gear is fixed by attaching the attachment member to the case of the transmission apparatus. Due to a functional requirement of transmitting the rotation of the carrier of the planetary gears to the countershaft, the coupling element is arranged closer to the gear shaft and the countershaft than the planetary gear mechanism (that is, between the planetary gear mechanism and a portion including the gear shafts and the countershaft). Further, the coupling element has a movable member for mechanically displacing the connecting/disconnecting member for selecting a predetermined speed stage. Because the movable member is driven by an actuator, the movable member needs to be inserted from outside the assembly including the planetary gear mechanism and the coupling element. However, in the assembled state, the coupling element is configured to be arranged inside the planetary gear mechanism, so that it is impossible to insert the movable member from outside after assembling. Accordingly the movable member also needs to be assembled together when the planetary gear mechanism and the coupling element are assembled. In that case, by forming the opening that allows the insertion of movable member, in advance, in the circumferential side surface of the attachment member, it becomes easier to arrange the movable member at a predetermined location by inserting the movable member via the openings. Therefore, the configuration having the opening formed in the circumferential side surface of the attachment member in order to allow the movable member to be inserted through the opening can provide an optimum configuration that fulfils both requirements, namely, fixing of the ring gear and implementation of connection/disconnection control of the coupling element.

In a further embodiment, the coupling element is a synchronizer (synchromesh mechanism), and the connecting/disconnecting member includes a synchronizer sleeve and a synchronizer ring, and the movable member is a shift fork that engages with the synchronizer sleeve to cause a displacement in an axial direction, the opening formed in the circumferential side surface of the attachment member to allow the movable member to be inserted through the opening includes two openings for inserting the shift fork, and an additional opening is provided in the circumferential side surface of the attachment member, the additional opening having a size to allow a finger of a human operator to be inserted through the additional opening, whereby a member inside the attachment member can be retained by the inserted finger.

According to the embodiment, the coupling element is the synchronizer (synchromesh mechanism), and the movable member is the shift fork that engages with the synchronizer sleeve to cause a displacement in an axial direction. Further, the opening formed in the circumferential side surface of the attachment member and that allows the insertion of the movable member includes two openings for inserting the shift fork. Still further, an additional opening is provided in the circumferential side surface of the attachment member. Accordingly, when assembling the planetary gear mechanism and the synchronizer arranged therein to one end of the first gear shaft, in a state where the ring gear, the planetary gears, and elements relating to the synchronizer are combined, the human operator's finger or fingers can be inserted from the additional opening from outside the attachment member. As a result, it is possible to retain the member (such as the planetary gears and the elements related to the synchronizer) inside the attachment member with the inserted finger or fingers, the assembly work can be smoothly carried out.

BRIEF DESCRIPTION OF DRAWINGS

FIG. 3 is a cross-sectional view in an axial direction illustrating one example of a planetary gear mechanism and a synchromesh mechanism by partially enlarging a mechanism relating to one end of the first input shaft (first gear shaft).

FIG. 5 is a perspective view illustrating a state in which the three components shown in FIG. 4 are assembled.

DETAILED DESCRIPTION

Figure 1:
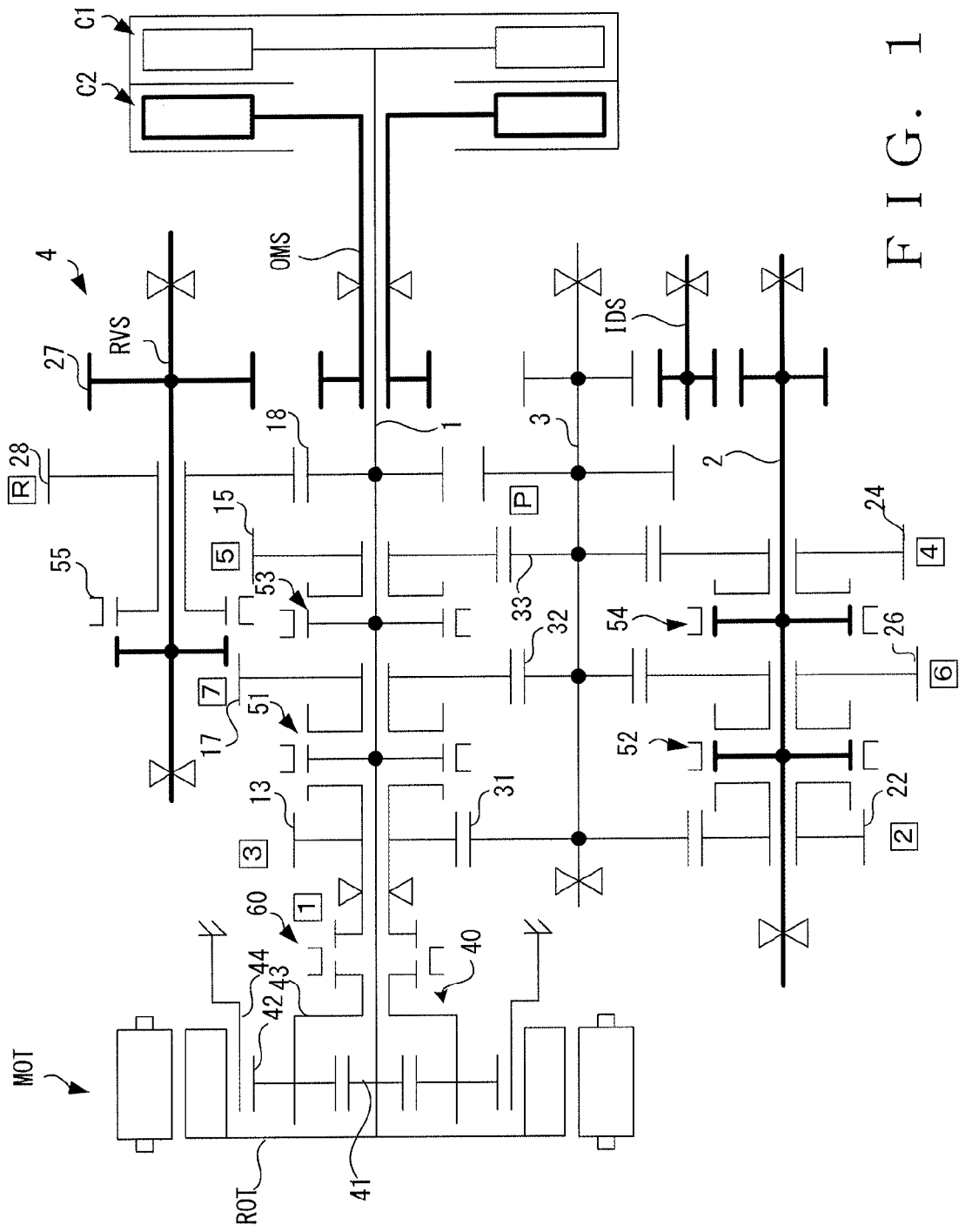
FIG. 1 is a skeleton diagram of a transmission apparatus according to an embodiment of the invention.

FIG. 1 is a skeleton diagram of a transmission apparatus 4 according to one embodiment of the invention. The transmission apparatus 4 is a parallel shaft transmission with seven forward gears and one reverse gear, and is also a dry dual clutch transmission (DCT).

The transmission apparatus 4 includes a first input shaft (namely, first gear shaft) 1 that is connected to the internal combustion engine (not shown) in a disconnectable manner via a first clutch (namely, first connecting/disconnecting means) C1 for odd-numbered speed stages, a second input shaft (namely, second gear shaft) 2 that is connected to the internal combustion engine in a disconnectable manner via the second clutch C2 for even-numbered speed stages, and a countershaft (namely, drive output shaft) 3 that connects to the respective input shafts (gear shafts) 1, 2 via a speed-change mechanism provided on the respective input shafts (gear shafts) 1, 2 and that generates a rotation force corresponding to the selected speed stage, and planetary gears 40 provided on one end side of the first input shaft (first gear shaft) 1. Also, a rotor ROT of an electric motor MOT is fixed to one end of the first input shaft (first gear shaft) 1, and the transmission apparatus 4 functions as a transmission for a hybrid vehicle that includes an internal combustion engine and an electric motor MOT as drive sources. The countershaft 3 (drive output shaft) is connected to a differential mechanism, not shown, and drives drive wheels of a vehicle.

The characteristics of the invention relate to the planetary gear mechanism 40, and configurations of other parts of the speed-change gear mechanism may employ known configurations, as appropriate. However, to understand an overview of the embodiments, first, the overview of the speed-change gear mechanism other than the planetary gear mechanism 40 will be described, and then the planetary gear mechanism 40 will be described.

An outer main shaft OMS is connected to an output shaft of the second clutch (second connecting/disconnecting means) C2, and the outer main shaft OMS is arranged concentrically with the first input shaft 1 so as to form an outer cylinder for the first input shaft 1. The outer main shaft OMS constantly engages with a reverse shaft RVS and the second input shaft (namely, second gear shaft) 2 via an idle shaft IDS, and the rotational output from the second clutch C2 is transmitted to the reverse shaft (also corresponds to the second gear shaft) RVS and the second input shaft (second gear shaft) 2. These shafts are parallel to each other.

On the first input shaft 1, a third-speed drive gear 13, a seventh-speed drive gear 17 and a fifth-speed drive gear 15 are arranged concentrically with each other so as to be relatively rotatable with each other. A third-to-seventh speed synchromesh mechanism 51 is provided slidably in the axial direction between the third-speed drive gear 13 and the seventh speed drive gear 17, and a fifth-speed synchromesh mechanism 53 is provided slidably in the axial direction to correspond to the fifth-speed drive gear 15. The synchromesh mechanism corresponding to the desired gear stage is slid so as to synchronize (pre-shift) the desired-speed gear stage, and the desired-speed gear stage is connected to the first input shaft 1. The first speed-change gear mechanism for realizing the odd-numbered speed stages (namely, third, fifth and seventh stages) is configured by the gears and the synchromesh mechanism provided in relation to the first input shaft 1. The respective drive gears 13, 17, 15 of the first speed-change gear mechanism mesh with the corresponding driven gears 31, 32, 33 provided on the countershaft 3, to rotatively drive the countershaft 3.

Similarly, on the second input shaft 2, a second-speed drive gear 22, a sixth-speed drive gear 26, and a fourth-speed drive gear 24 are arranged concentrically with each other so as to be relatively rotatable with each other. A second-to-sixth speed synchromesh mechanism 52 is provided slidably in the axial direction between the second-speed drive gear 22 and the sixth-speed drive gear 26, and a fourth-speed synchromesh mechanism 54 is provided slidably in the axial direction to correspond to the fourth-speed drive gear 24. The synchromesh mechanism corresponding to the desired gear stage is slid so as to synchronize with the desired-speed gear stage, and the desired-speed gear stage is connected to the second input shaft 2. The second speed-change gear mechanism for realizing the even-numbered speed stages (namely, second, fourth and sixth stages) is configured by the gears and the synchromesh mechanism provided in relation to the second input shaft 2. The drive gears 22, 26, 24 of the second speed-change gear mechanism mesh with the corresponding driven gears 31, 32, 33 provided on the countershaft 3, to rotatively drive the countershaft 3.

On one end of the first input shaft 1 near the electric motor MOT, the planetary gear mechanism 40 is arranged. The planetary gear mechanism 40 includes a sun gear 41, planetary gears 42 and a ring gear 44, and the sun gear 41 is fixed to the first input shaft 1 so as to rotate integrally with the first input shaft (first gear shaft) 1 and the electric motor MOT. The ring gear 44 is fixed to the case of the transmission apparatus 4 and configured such that a speed-change output is generated from a carrier 43 of the planetary gears 42. A first-speed synchromesh mechanism 60 is provided between the planetary gear carrier 43 and the gear 13 on the first input shaft 1. When, in accordance with a selection of the first-speed gear stage, the first-speed synchromesh mechanism 60 is turned ON and the planetary gear carrier 43 and the gear 13 on the first input shaft 1 are connected, the rotation of the planetary gear carrier 43 is transmitted to the gear 13, and the countershaft 3 is rotatively driven via the driven gear 31. Accordingly, the speed of rotation of the first input shaft (first gear shaft) 1 is shifted by a first-speed gear ratio which is determined by a combination of a gear ratio of the planetary gear mechanism 40 and a gear ratio of the third-speed gear 13 to be output from the countershaft 3. Note that, at this time, the third-to-seventh speed synchromesh mechanism 51 is at a neutral position, the third-to-seventh speed synchromesh mechanism 51 does not engage with the gear 13. When a higher speed than the first speed, i.e., the second to seventh speeds, is selected, the first-speed synchromesh mechanism 60 is disengaged, the planetary gear carrier 43 and the gear 13, in short the countershaft 3, are not connected. The synchromesh mechanism 60 is provided connectably and disconnectably to the planetary gear carrier 43 so as to allow selection of a predetermined speed stage, and functions as a coupling element which transmits the rotation of the planetary gear carrier 43 to the countershaft 3 when connected to the planetary gear carrier 43. Configuration other than the synchromesh mechanism may be used for the coupling element as long as a similar function can be realized.

According to the present embodiment, when the ring gear 44 is constantly fixed in the planetary gear mechanism 40 and a predetermined speed stage (for example, first-speed) is selected, the rotation of the planetary gear carrier 43 is transmitted to the countershaft 3 via the synchromesh mechanism 60 and through the gear 13. If a speed stage other than the specified speed stage is selected, because the carrier 43 is separated from the gear 13, the planetary gear carrier 43 is not constantly dragged by the rotation of the countershaft 3, and therefore the carrier only rotates in accordance with the rotation of the sun gear 41 that rotates in accordance with the rotation of the first input shaft 1. In addition, the ring gear 44 is constantly fixed so that it never rotates. Accordingly, because the carrier 43 is not dragged by the rotation of the countershaft 3, differential rotation of the planetary gear mechanism 40 can be reduced particularly in a high-speed region of the vehicle with a high workload, the no-load rotational loss can be drastically reduced, and generation of heat due to rotational friction can also be reduced. Consequently, the power transmission efficiency of the transmission apparatus 4 is improved, as well as the fuel efficiency and the cooling performance.

Figure 2:
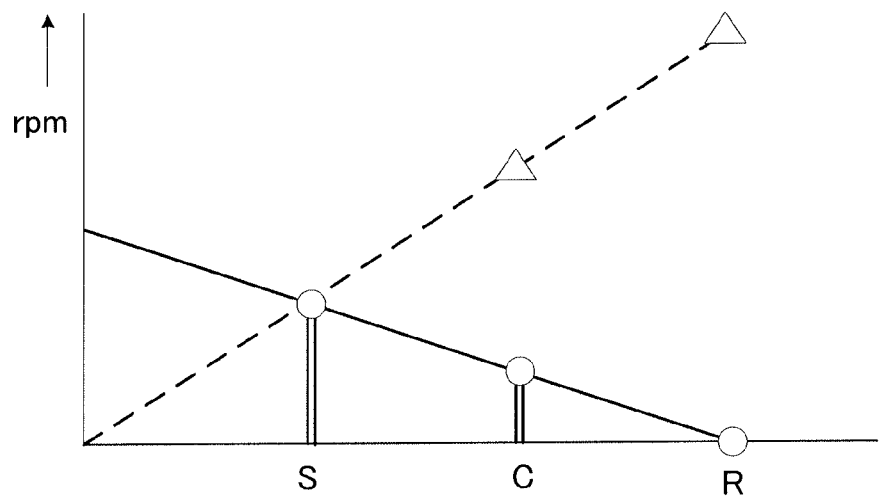
FIG. 2 is a graph showing a velocity diagram for a planetary gear mechanism according to the present embodiment and a velocity diagram for a planetary gear mechanism according to a conventional example for comparison.
Figure 7:
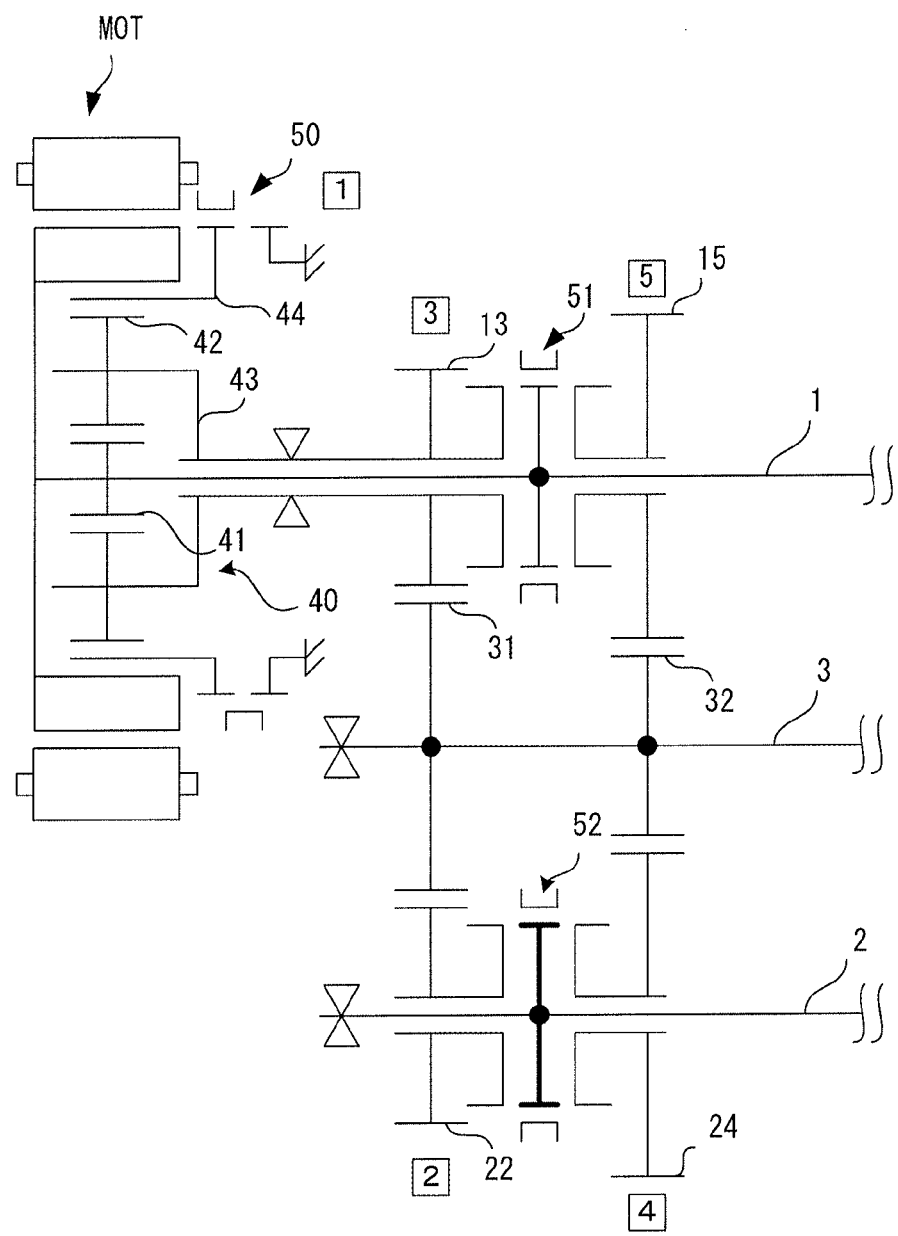
FIG. 7 is a skeleton diagram that illustrates the parts relating to the planetary gear mechanism that have been extracted from the description of the conventional dual clutch transmission.

For the purpose of comparison, in FIG. 2, a solid line shows the velocity diagram for the planetary gear mechanism 40 according to the present embodiment, whereas a dashed line shows a velocity diagram of the planetary gear mechanism of a conventional example as shown in FIG. 7. As shown by the solid line, according to the planetary gear mechanism 40 of the present embodiment, because the ring gear (R) 44 is fixed, a rotational speed (rpm) of the carrier (C) 43 is considerably reduced, and friction due to the differential rotation can be reduced thereby.

Next, referring back to FIG. 1, the reverse shaft RVS will be described. A gear 27 that engages with the idle shaft IDS is fixed to the reverse shaft RVS. Further, a reverse gear set for selectively connecting the reverse shaft RVS to the first input shaft 1 is provided in the outer periphery of the reverse shaft RVS. The reverse gear set comprises a reverse drive gear 28 provided concentrically to and relatively rotatable with respect to the reverse shaft RVS, a reverse synchromesh mechanism 55 for selectively connecting the reverse drive gear 28 to the reverse shaft RVS, and a gear 18 fixed to the first input shaft 1 so as to mesh with the reverse drive gear 28. The reverse synchromesh mechanism 55 is slidable in an axial direction of the reverse shaft RVS, and the synchromesh mechanism 55 is turned OFF (the reverse shaft RVS is not engaged with the reverse drive gear 28) when moving forward, and the synchromesh mechanism 55 is turned ON when moving backward so that the reverse shaft RVS is engaged with the reverse drive gear 28. Also, when moving backward, the second clutch C2 is engaged so that the rotation of the second clutch C2 is transmitted to the reverse shaft RVS via the outer main shaft OMS and the idle shaft IDS, whereby the reverse drive gear 28 is rotated. When the reverse drive gear 28 rotates, the first input shaft 1 rotates in an opposite direction of the rotation at forward movement. Also, when running in reverse, the first-speed synchromesh mechanism 60 is turned ON, and the rotation in the opposite direction to the first input is transmitted from the carrier 43 of the planetary gear mechanism 40 via the gear 13 connected thereto to the countershaft 3. In other words, when running in reverse, not only the reverse drive gear 28 (reverse gear stage) is selected in the second speed-change gear mechanism, the first-speed synchromesh mechanism 60 is turned ON.

Next, structural characteristics of the present embodiment will be described. In the present embodiment, due to a functional requirement of transmitting the rotation of the carrier 43 of the planetary gears 42 to the countershaft 3, the first-speed synchromesh mechanism 60 (namely, the coupling element) is arranged closer to the input shafts (gear shaft) 1, 2 and the countershaft 3 rather than the planetary gear mechanism 40 (that is, between the planetary gear mechanism 40 and a portion including the gear shafts 1, 2 and the countershaft 3). Also, the synchromesh mechanism 60 has a movable member (namely, a shift fork) that mechanically displaces a connecting/disconnecting member (namely, a synchronizer sleeve and a synchronizer ring) to select a predetermined speed stage. Accordingly, when assembling the planetary gear mechanism 40 and the synchromesh mechanism 60 to the transmission apparatus 4 during manufacturing, at least those parts that are engaged with one another or connected to one another need to be handled integrally and be assembled skillfully. Methods that should be taken for achieving this purpose, in reference to the present embodiment, will now be described.

FIG. 3 is a cross-sectional view in an axial direction illustrating one example of the planetary gear mechanism 40 and the synchromesh mechanism 60 by partially enlarging a mechanism relating to one end of the first input shaft (first gear shaft) 1. The structure of the synchromesh mechanism 60 itself is of a known structure. In other words, the synchromesh mechanism 60 is configured by including a synchronizer hub 61, a synchronizer sleeve 62 that rotates integrally with the hub 61 by spline coupling and that engages with the hub 61 in a relatively displaceable manner in the axial direction, a synchronizer ring 63, a snap ring (circlip) 64 attached to the ring 63, a dog spline portion 65 having a tapered surface that frictionally engages a tapered friction surface of the synchronizer ring 63, and the like. Because further details relating to the mechanism for synchronizing the rotation in the synchromesh mechanism 60 are publicly known, illustration and description thereof will be omitted.

The sun gear 41 of the planetary gear mechanism 40 is assembled to the first input shaft 1 by being inserted into one end of the first input shaft 1 to be fixed thereon, such that the sun gear 41 rotates integrally with the first input shaft 1. A hub 43a of the carrier 43 is received by a bearing 70 on the outer periphery of the first input shaft 1 so as to rotate relatively thereto. The synchronizer hub 61 is assembled to the hub 43a of the carrier 43 such that the synchronizer hub 61 rotates integrally with the hub 43a. The ring gear 44 is attached to one end side of an annular attachment member 45, and the other end side of the annular attachment member 45 is attached to a case 80 of the transmission apparatus 40 via a bolt 46. Thus, the ring gear 44 is fixed such that it does not rotate.

On the other hand, the gear 13 is received by a bearing 71 on the outer periphery of the first input shaft 1 so as to rotate relatively thereto. The dog spline portion 65 of the synchromesh mechanism 60 is assembled to the base portion 13a of the gear 13 by being inserted into the base portion 13a to be fixed thereon, such that the dog spline portion 65 rotates integrally with the base portion 13a. The gear 13 corresponds to a counter member that rotates integrally with the countershaft 3, and the gear 13 is provided concentrically with the first input shaft (first gear shaft) 1.

When the synchromesh mechanism 60 is not engaged (OFF), the synchronizer sleeve 62 is not engaged with the synchronizer ring 63, and the rotation of the carrier 43 is not transmitted to the gear 13 (counter member). When the synchromesh mechanism 60 is engaged (ON), the synchronizer sleeve 62 is slid, by the shift fork (not shown in FIG. 3), in a right direction from a position shown by a solid line to a position shown by a dashed line and engages with the synchronizer ring 63 and the dog spline portion 65. Accordingly, the engagement is established such that the rotation of the carrier 43 is transmitted to the gear 13 (counter member).

In the above structure, the synchronizer hub 61 of the synchromesh mechanism 60 corresponds to a first coupling member structured to rotate integrally with the carrier 43 of the planetary gears 42. Also, the dog spline portion 65 of the synchromesh mechanism 60 corresponds to a second coupling member structured to rotate integrally with the counter member (gear 13). Further, the synchronizer sleeve 62, the synchronizer 63, and rotation synchronizing mechanisms or the like relating thereto, not shown, correspond to a connecting/disconnecting member that connects/disconnects the first and the second coupling members by being mechanically displaced. The shift fork corresponds to a movable member that displaces the connecting/disconnecting member so as to select a predetermined speed stage (first speed, for example). As described below in detail, an opening 45a is formed in a circumferential side surface of the attachment member 45 so as to allow the shift fork (movable member) to be inserted through the opening 45a.

FIG. 3 shows a state in which the planetary gears 42 and the synchromesh mechanism 60 have been assembled to the transmission apparatus 4. Next, methods to be taken in manufacture to efficiently assemble the respective components shown in FIG. 3 will be described.

Figure 4:
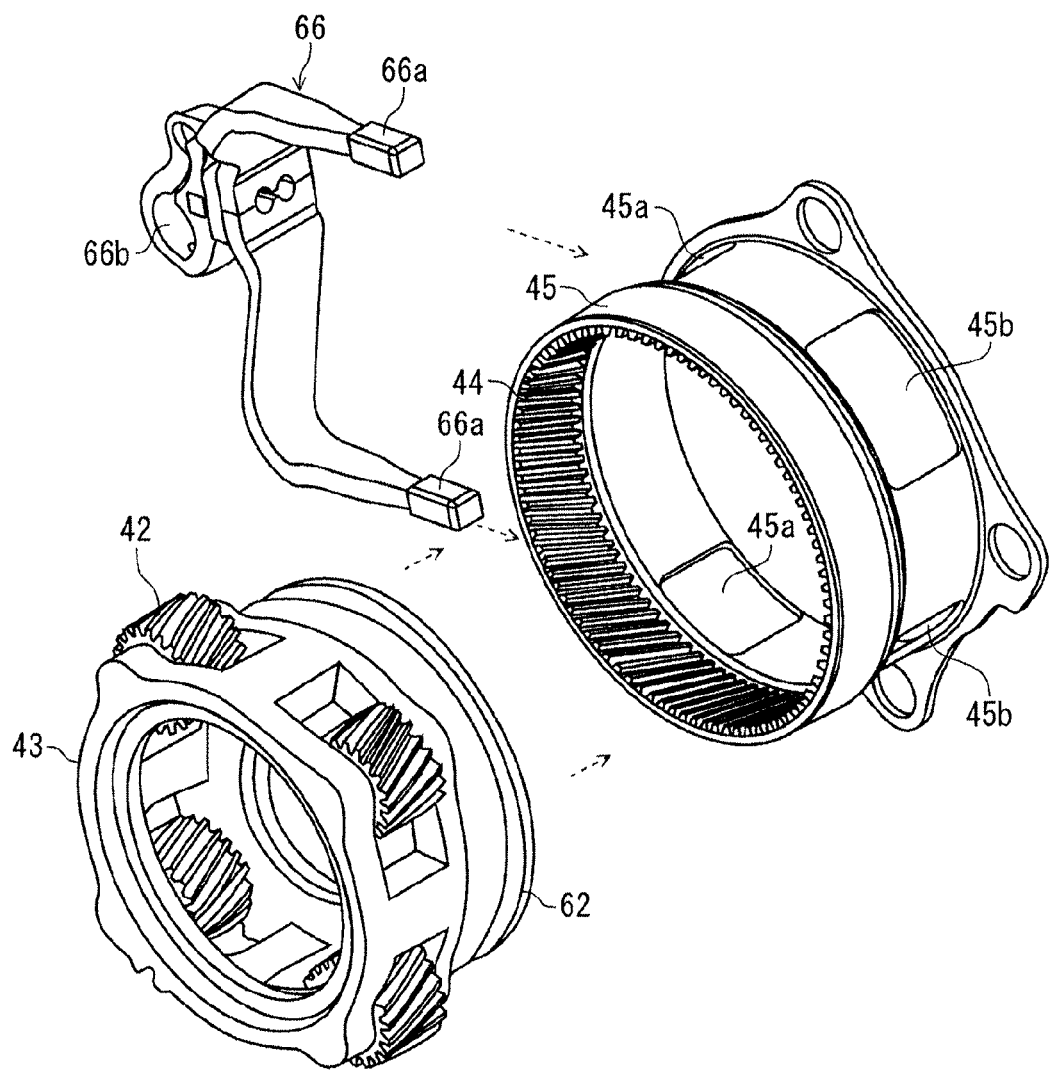
FIG. 4 is an exploded perspective view of an attachment member with a ring gear attached thereto, a shift fork (movable member), and an assembly including planetary gears, a carrier, a synchronizer hub, and a synchronizer sleeve.

FIG. 4 is an exploded perspective view of three components including an attachment member 45 with the ring gear 44 attached thereto, a shift fork (a movable member) 66, and an assembly including the planetary gears 42, the carrier 43, the synchronizer hub 61, and the synchronizer sleeve 62. The shift fork (movable member) 66 has two fork ends 66a. Two openings 45a that allow an insertion of the fork ends 66a are formed in the circumferential side surface of the annular attachment member 45, on which the ring gear 44 is not attached. The assembly including the planetary gears 42, the carrier 43, the synchronizer hub 61, and the synchronizer sleeve 62 can be formed in one piece by fixing the synchronizer hub 61 to a set including the planetary gears 42 and the carrier 43, then fitting the synchronizer sleeve 62 to spline teeth on the outer periphery of the synchronizer hub 61.

Three components shown in FIG. 4 are assembled into one assembly as shown in FIG. 5. In other words, the assembly including the planetary gears 42, the carrier 43, the synchronizer hub 61 and the synchronizer sleeve 62 is inserted into the annular attachment member 45 to which the ring gear 44 has been attached. Then, the two fork ends 66a of the shift fork (movable member) 66 are inserted through the two openings 45a, and the fork ends 66a are accommodated in an annular groove provided on the outer periphery of the synchronizer sleeve 62 inside the attachment member 45. Here, as shown in FIG. 4, two, for example, of additional openings 45b are provided on the circumferential side surface of the annular attachment member 45. Each of the additional openings 45b has a size to allow a finger of a human operator to be inserted through the additional opening 45b. Accordingly, a member (the assembly including the planetary gears 42, the carrier 43, the synchronizer hub 61 and the synchronizer sleeve 62) that has been inserted inside the attachment member 45 can be retained with the inserted finger. In other words, at the stage at which the three components shown in FIG. 4 have merely been assembled into one assembly as shown in FIG. 5, the synchronizer hub 61 and the synchronizer sleeve 62 portions are unstable, in particular. Therefore, the work efficiency will be improved when an operator inserts his/her finger from the openings 45b and supports the unstable portions during assembly work.

Figure 6:
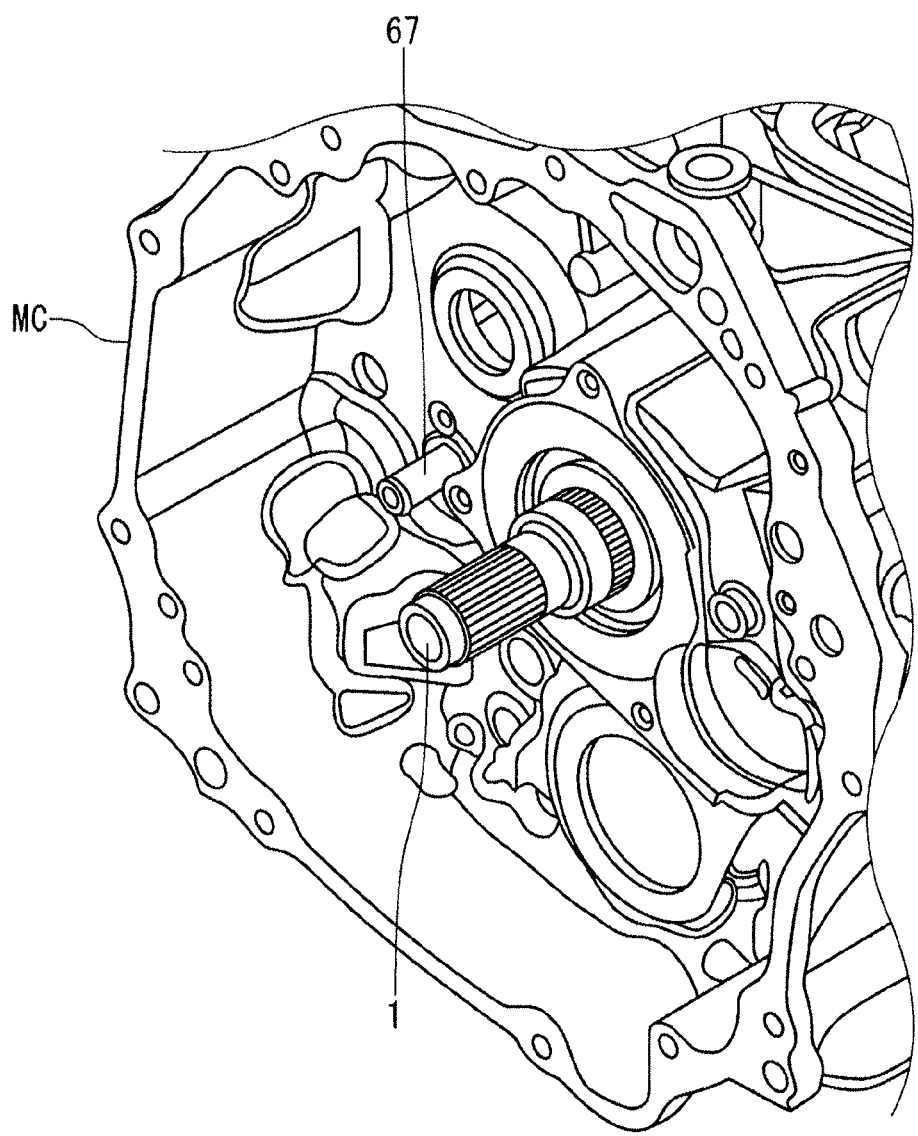
FIG. 6 is a perspective view illustrating one end of a first input shaft (first gear shaft) in a state immediately before assembling the planetary gear mechanism and the synchromesh mechanism during manufacturing of the transmission apparatus.

FIG. 6 is a perspective view that illustrates one end side of the first input shaft (first gear shaft) 1 to which the planetary gear mechanism 40 and the synchromesh mechanism 60 are to be assembled in a state immediately before assembling the planetary gear mechanism 40 and the synchromesh mechanism 60. In this state, all speed-change gear mechanisms (gear 13 or the like) other than the planetary gear mechanism 40 and the synchromesh mechanism 60 are assembled, and an electric motor case MC is mounted. In this state, first, an assembly including the synchronizer sleeve 62 of the synchromesh mechanism 60, the snap ring (circlip) 64 and the dog spline portion 65 (FIG. 3) is set, and the dog spline portion 65 is fixed to the base portion 13a of the gear 13 (counter member). Next, the assembly assembled into one piece as shown in FIG. 5 is set to the first input shaft 1 all together. At that time, the human operator grabs the assembly shown in FIG. 5 with both hands, and retains the fork 66 in a predetermined position. Further, while inserting his/her finger from the opening 45b and supporting the member that has been inserted inside the attachment member 45, the human operator inserts the assembly into the first input shaft 1. When the assembly is set in a predetermined mounting state, the bolt 46 (FIG. 3) of the attachment member 45 is tightened to be fixed. Note that, in the predetermined mounting state, an activation rod 67 (FIG. 6) of an actuator (not shown) is inserted into an attachment hole 66b (FIG. 4) of the shift fork 66 to be fixed thereto. Lastly, the sun gear 41 is inserted into the first input shaft 1 to be fixed thereto. Thus, assembling of the planetary gear mechanism 40 and the synchromesh mechanism 60 is complete. Afterwards, the rotor ROT of the electric motor MOT is fixed to the first input shaft 1, and the electric motor MOT is accommodated in the electric motor case MC.

As described above, because the openings 45a that allow the insertion of the synchro fork 66 (movable member) have been formed in the circumferential side surface of the annular attachment member 45 for fixing the ring gear 44 of the planetary gear mechanism 40, an optimum configuration that fulfils both requirements, namely, fixing of the ring gear 44 and implementation of connection/disconnection control of the synchromesh mechanism 60 (coupling element) can be provided. In other words, in the assembled state, the synchromesh mechanism 60 (coupling element) is arranged inside the planetary gear mechanism 40. Therefore, the shift fork 66 (movable member) cannot be inserted from outside after the assembling is complete. Accordingly, the shift fork 66 (movable member) also needs to be assembled when the planetary gear mechanism 40 and the synchromesh mechanism 60 (coupling element) are assembled. In that case, by forming the openings 45a that allow the insertion of the shift fork 66 (movable member), in advance, in the circumferential side surface of the attachment member 45, it becomes easier to arrange the shift fork 66 (movable member) at a predetermined location by inserting the shift fork 66 (movable member) via the openings 45a, and the assembly work can be efficiently carried out.

Also, the additional opening 45b is provided in the circumferential side face of the attachment member 45 so that the member inside the attachment member 45 can be retained with fingers inserted through the opening 45b during assembly work. Accordingly, when assembling the planetary gear mechanism 40 and the synchromesh mechanism 60 arranged therein to one end of the input shaft (first gear shaft) 1, in a state where the ring gear 44, the planetary gears 42, and elements relating to the carrier 43 and the synchromesh mechanism 60 are combined, the operator's fingers can be inserted from the additional openings 45b from outside the attachment member 45. As a result, it is possible to retain the member (such as the planetary gears and the elements related to the synchronizer) inside the attachment member 45 with the inserted fingers, the assembly work can be smoothly carried out.

This application is based on, and claims priority to, JP PA 2014-053376 filed on 17 Mar. 2014. The disclosure of the priority application, in its entirety, including the drawings, claims, and the specification thereof, are incorporated herein by reference.

What is claimed is:

1. A transmission apparatus for use of an internal combustion engine and an electric motor as a drive source, comprising:
    a first gear shaft configured to disconnectably couple to the internal combustion engine via a first clutch;
    a second gear shaft configured to disconnectably couple to the internal combustion engine via a second clutch;
    a first speed-change gear mechanism provided on the first gear shaft and configured to selectively set a speed stage to any one of a first group of speed stages;
    a second speed-change gear mechanism provided on the second gear shaft and configured to selectively set a speed stage to any one of a second group of speed stages;
    a countershaft coupled to the first and second gear shafts via the first and second speed-change gear mechanisms so that a rotational output corresponding to a selected speed stage is produced from the countershaft;
    a planetary gear mechanism including a sun gear, planetary gears and a ring gear, wherein the sun gear is arranged so as to rotate integrally with the first gear shaft and the electric motor, the ring gear is fixed to a case of the transmission, and a speed-changed output is produced from the planetary gears;
    a counter member provided concentrically with the first gear shaft and configured to rotate integrally with the countershaft; and
    a coupling element disposed between a carrier of the planetary gears and the counter member and configured to disconnectably connect the carrier of the planetary gears to the counter member in order to select a predetermined speed so that rotation of the carrier of the planetary gears is transmitted to the countershaft via the counter member.

2. The transmission apparatus according to claim 1, wherein
    the planetary gear mechanism is provided on one end side of the first gear shaft,
    the ring gear is attached to one end side of an annular attachment member which is attached to the case,
    the coupling element includes a first coupling member configured to rotate integrally with the carrier of the planetary gears, a second coupling member configured to rotate integrally with the counter member, a connecting/disconnecting member configured to mechanically displace to connect or disconnect the first and the second coupling members, and a movable member for displacing the connecting/disconnecting member, and
    an opening is formed in a circumferential side surface of the attachment member to allow the movable member to be inserted through the opening.

3. The transmission apparatus according to claim 2, wherein
    the coupling element is a synchronizer, and the connecting/disconnecting member includes a synchronizer sleeve and a synchronizer ring, and the movable member is a shift fork that engages with the synchronizer sleeve to cause a displacement in an axial direction,
    the opening formed in the circumferential side surface of the attachment member to allow the movable member to be inserted through the opening includes two openings for inserting the shift fork, and
    an additional opening is provided in the circumferential side surface of the attachment member, the additional opening having a size to allow a finger of a human operator to be inserted through the additional opening, whereby a member inside the attachment member can be retained by the inserted finger.

* * * * *